(12) United States Patent
Miller et al.

(10) Patent No.: US 7,423,706 B2
(45) Date of Patent: Sep. 9, 2008

(54) PHORETIC CELL

(75) Inventors: Richard Jonathan Miller, Malvern (GB); Isabelle Marianne Votte, Malvern (GB)

(73) Assignee: Qinetiq Limited (GB)

( * ) Notice: Subject to any disclaimer, the term of this patent is extended or adjusted under 35 U.S.C. 154(b) by 240 days.

(21) Appl. No.: 10/587,157

(22) PCT Filed: Jan. 21, 2005

(86) PCT No.: PCT/GB2005/000222

§ 371 (c)(1),
(2), (4) Date: Jul. 25, 2006

(87) PCT Pub. No.: WO2005/073793

PCT Pub. Date: Aug. 11, 2005

(65) Prior Publication Data

US 2007/0159437 A1 Jul. 12, 2007

(30) Foreign Application Priority Data

Jan. 28, 2004 (GB) ................................. 0401766.1

(51) Int. Cl.
*G09G 3/36* (2006.01)
*G02F 1/1333* (2006.01)
*G02F 1/1337* (2006.01)

(52) U.S. Cl. .................... 349/86; 349/123; 349/129; 349/166; 345/97

(58) Field of Classification Search .............. None
See application file for complete search history.

(56) References Cited

U.S. PATENT DOCUMENTS

| 4,305,807 | A | 12/1981 | Somlyody et al. |
| 6,287,649 | B1 * | 9/2001 | Fukushima et al. .......... 428/1.2 |
| 7,311,951 | B2 * | 12/2007 | Miller et al. ................. 428/1.2 |
| 2004/0135763 | A1 * | 7/2004 | Kaneko et al. .............. 345/107 |
| 2007/0159437 | A1 * | 7/2007 | Miller et al. .................. 345/97 |

FOREIGN PATENT DOCUMENTS

| EP | 1 139 154 | 10/2001 |
| EP | 1 154 312 | 11/2001 |
| WO | WO 2004/015491 | 2/2004 |

OTHER PUBLICATIONS

Tsonev et al., "The Surface Memory Effect at Conducting and Dielectric Surface Coatings", Liquid Crystals, vol. 24, pp. 853-859 (1998).
Myrvold, "A Weak Surface Memory Effect in Liquid Crystal Cells with Rubbed Polyimide Layers", Liquid Crystals, vol. 18, pp. 287-290 (1995).

* cited by examiner

*Primary Examiner*—Tina M Wong
(74) *Attorney, Agent, or Firm*—McDonnell Boehnen Hulbert & Berghoff LLP

(57) ABSTRACT

A relief structure alignment layer comprising a relief structure surface incorporating at least one indentation, the at least one indentation having an internal surface extending from the relief structure surface, wherein the relief structure alignment layer has a surface memory alignment layer arranged to impart a preferred liquid crystal director alignment to a liquid-crystal material in contact therewith as well as methods for configuring a liquid crystal material within a cell having a relief structure alignment layer by applying at least one of an electric field and a magnetic field and phoretic displays comprising at least on relief structure alignment layer.

23 Claims, 2 Drawing Sheets

PHORETIC CELL

BACKGROUND OF THE INVENTION (1) Field of the Invention

The present invention relates to a phoretic display incorporating a liquid crystal suspension medium having a preferred configuration therein and to a method of achieving the preferred configuration of the liquid crystal suspension medium within the phoretic display. Such a phoretic display may be used in a wide range of electronic consumer goods, for example household electrical and electronic items, mobile telephones, personal computers, electronic personal organizers, e-books etc.

(2) Description of the Art

Phoretic displays typically comprise a suspension layer containing finely divided phoretic particles dispersed within a liquid suspension medium. The spatial distribution of the phoretic particles within the suspension layer may be altered by applying a magnetic or electric field to the device. The particles migrate within the device under the influence of the applied field.

A phoretic display device exhibiting non-linear optical behaviour may be achieved using a phoretic cell incorporating a liquid crystal suspension medium. with a phoretic particle suspended therein. The above mentioned phoretic cell and phoretic display. are. described in further detail in patent application PCT/GB03/003512.

In particular, an electrophoretic display may be fabricated using an electrophoretic system in which particles of an electrophoretic material are suspended in a liquid crystal suspension medium and where the geometry of the system is arranged to promote defects within the liquid crystal material. A defect may be thought of as a local break in the orientational symmetry of the liquid crystal material, for example a local break in the orientational order of the liquid crystal director. Such defects are sometimes referred to as disclinations in the liquid crystal material.

The defects within the liquid crystal material are configured to attract electrophoretic particles; each defect giving rise to an associated region of influence within the liquid crystal material. Once within a particular region of influence, an electrophoretic particle is attracted towards the defect associated with that. region of influence. If unobstructed, the electrophoretic particle will move within the region of influence to adopt a preferred position where the elastic energy due to the defect is minimised.

The defects create a threshold level in the device. An applied electric field must exceed this threshold, for a sufficient time period, in order to remove a particle from the region of influence associated with a defect. A useful display device may be achieved by selectively positioning the defects in the liquid crystal material at the surface(s) of the display. An image may be formed on the display by varying the spatial distribution of the electrophoretic particles at the defects on the display surface(s). A bistable or multi-stable display may be formed by arranging defects on opposing surfaces of the display.

One technique for selectively positioning the defects at the surface(s) of the display consists of disposing a relief structure at the display surface(s). The profile of the relief structure typically comprises an array of indentations, with each indentation creating a defect site and a preferred position for an electrophoretic particle within the liquid crystal material.

The relief structure surface is adapted to provide a preferred orientation of the liquid crystal material within the display. Typically, the preferred orientation of the liquid crystal material comprises an essentially non-homeotropic alignment of the liquid crystal director at the relief structure surface, i.e. a tangential component of the liquid crystal director is encouraged giving a tilted or planar alignment. The preferred orientation may be achieved by applying a suitable surface alignment treatment to the relief structure.

Notwithstanding the efficacy of the foregoing, circumstances may arise where a simple surface alignment treatment is insufficient to provide the preferred orientation of the liquid crystal material at the relief structure surface. For example, depending upon the particular geometry of the relief structure surface, undesirable parasitic effects may conspire against the creation and correct positioning of defects sites within the phoretic cell.

In particular, problems may be encountered in configurations where the preferred alignment of the liquid crystal material gives rise to strong localised distortions of the liquid crystal director. The distortions within the liquid crystal director create a high degree of elastic or defect energy within the material which can lead to instability of the configuration and to the potential failure of the display.

SUMMARY OF THE INVENTION

It is an object of the present invention to mitigate at least some of the disadvantages of the above phoretic display. It is a further object of the present invention to provide a method for achieving the preferred configuration of the liquid crystal suspension medium within the phoretic display.

According to a first aspect of the present invention there is now proposed a relief structure alignment layer comprising a relief structure surface incorporating at least one. indentation, the at least one indentation having an internal surface extending from the relief structure surface, wherein the relief structure alignment layer has a surface memory alignment layer arranged to impart a preferred liquid crystal director alignment to a liquid crystal material in contact therewith.

The surface memory alignment layer provides a surface memory effect in order to provide the preferred configuration of the liquid crystal material within the present phoretic cell. Surface memory behaviour arises when a liquid crystal material is in contact with a solid surface and wherein the alignment of the liquid crystal in contact with the surface is reinforced by the continual diffusion of molecules in and out of the solid surface In the interests of clarity, the relief structure surface is the facet of the relief structure alignment layer from which the plurality of indentations extend. For the avoidance of doubt, once the plurality of indentations have been formed in the relief structure surface then the internal surfaces of said indentations are no longer considered to comprise part of the relief structure surface.

Advantageously, the preferred alignment of the liquid crystal director comprises a substantially planar alignment at the internal surface of the at least one indentation, a substantially homeotropic alignment in the bulk of the liquid crystal material and a defect in the liquid crystal alignment associated with each indentation in the absence of a phoretic particle there from.

The term "associated" has been used in the foregoing to describe the positioning of a defect in the liquid crystal director alignment with respect to each indentation giving rise thereto.

In some cases, but not exclusively, the defects may be "virtual" defects. A virtual defect occurs where the defect centre is actually outside the region of the liquid crystal but it still exerts influence on the behaviour of the liquid crystal.

This influence is brought about by the alignment of the liquid crystal at the surface into which the virtual defect is hidden. Typically, a virtual defect may occur in cases where the surface anchoring energy is weak or the surface has a non-zero pretilt.

In the interests of clarity, where there is a reference to a defect in this patent specification, said defect may be a virtual defect hidden in a surface or a conventional defect within the liquid crystal material.

Preferably, the relief structure alignment layer comprises a relief structure surface incorporating a plurality of indentations, each indentation having an internal surface extending from the relief structure surface.

Preferably, the indentations comprise substantially semi-ellipsoidal indentations.

Even more preferably, the indentations comprise substantially semi-spheroidal indentations.

Advantageously, the indentations comprise substantially semi-spherical indentations.

Even more advantageously, the indentations comprise substantially hemispherical indentations.

The prefix "semi" as used in the context of this specification shall be taken to define a part or portion of a geometric shape to which it is applied, without limitation to that portion being a half; for example a semi-spheroid shall define a portion of a spheroid (said portion not being limited to a half). Where the portion of a geometric shape comprises substantially a half of said shape, then the prefix "hemi" has been used herein in preference to the more generic prefix "semi"; for example the term "hemisphere" shall define substantially half of a sphere.

In a preferred embodiment, the surface memory alignment layer imposes a substantially planar liquid crystal director alignment at the relief structure alignment layer in the presence of a randomly oriented liquid crystal material.

Conveniently, the surface memory alignment layer comprises an isotropic material. The isotropic material have a surface energy greater than 30 erg/cm$^2$.

According to a second aspect of the present invention there is now proposed a phoretic display comprising a first display surface, a liquid crystal suspension medium, at least one phoretic particle suspended within the suspension medium and at least one relief structure alignment layer according to the first aspect of the present invention. The first display surface may be arranged to display an image.

In a preferred embodiment, the at least one relief structure alignment layer is arranged at the first display surface.

Advantageously, the phoretic display comprises a second display surface disposed remotely to the first display surface, and a second relief structure alignment layer disposed at the second display surface.

Preferably, each indentation is dimensioned so as to at least partly receive a phoretic particle.

Where the phoretic display comprises a first relief structure alignment layer disposed at the first display surface and a second relief structure alignment layer disposed at the second display, each indentation in the relief structure surface of the first relief structure alignment layer is preferably arranged substantially opposite a corresponding indentation in the relief structure surface of the second relief structure alignment layer, said indentations forming an opposing pair of indentations. Each opposing pair of indentations may encompass a phoretic particle.

In a preferred embodiment, the liquid crystal suspension medium is capable of adopting a nematic liquid crystal phase.

Preferably, the liquid crystal suspension medium exhibits a positive anisotropy of dielectric permittivity when in the nematic liquid crystal phase. In addition, or alternatively, the liquid crystal suspension medium may exhibit a positive anisotropy of magnetic permeability when in the nematic liquid crystal phase.

According to a third aspect of the present invention there is now proposed a method for configuring a liquid crystal material within a cell having a relief structure alignment layer; the relief structure alignment layer comprising a relief structure surface incorporating at least one indentation, the at least one indentation having an internal surface extending from the relief structure surface, the relief structure alignment layer having a surface memory alignment layer arranged to interact with an oriented liquid crystal material in contact therewith exhibiting a preferred liquid crystal director alignment and adapted to reproduce said preferred liquid crystal director alignment; the method comprising the steps of (i) introducing into the cell a liquid crystal material having an isotropic phase, (ii) applying a field to the display comprising at least one of an electric field and a magnetic field, (iii) converting the liquid crystal material from the isotropic phase to an oriented liquid crystal phase in the presence of said applied field thereby imparting the preferred alignment of the liquid crystal director within the cell, (iv) removing the applied field.

Advantageously, the oriented liquid crystal phase comprises a nematic liquid crystal phase.

Conveniently, the preferred alignment of the liquid crystal director comprises a substantially planar alignment at the internal surface of the at least one indentation, a substantially homeotropic alignment in the bulk of the liquid crystal material and a defect in the liquid crystal alignment associated with each indentation in the absence of a phoretic particle there from.

In a preferred embodiment, the field is applied in a direction substantially normal to the relief structure alignment layer.

The applied field may comprises an electric field, in which case the liquid crystal material preferably exhibits a positive anisotropy of dielectric permittivity. Alternatively, or in addition, the applied field may comprise a magnetic field, in which case the liquid crystal material preferably exhibits a positive anisotropy of magnetic permeability.

The step of converting the liquid crystal material from the isotropic phase to the oriented liquid crystal phase may comprise cooling the liquid crystal material from a temperature above the clearing point $T_c$, of the liquid crystal material.

The clearing point of the liquid crystal material $T_c$, is the transition temperature at which the material changes from an unordered isotropic configuration to an oriented liquid crystal phase, for example a nematic liquid crystal phase.

In a preferred embodiment, the method comprises an additional step of introducing a temporal delay between the step of converting the liquid crystal material from the isotropic phase to the oriented liquid crystal phase and the step of removing the applied field.

DESCRIPTION OF THE FIGURES

The invention will now be described, by example only, with reference to the accompanying drawings in which.

DETAILED DESCRIPTION OF THE INVENTION

Figure 1:
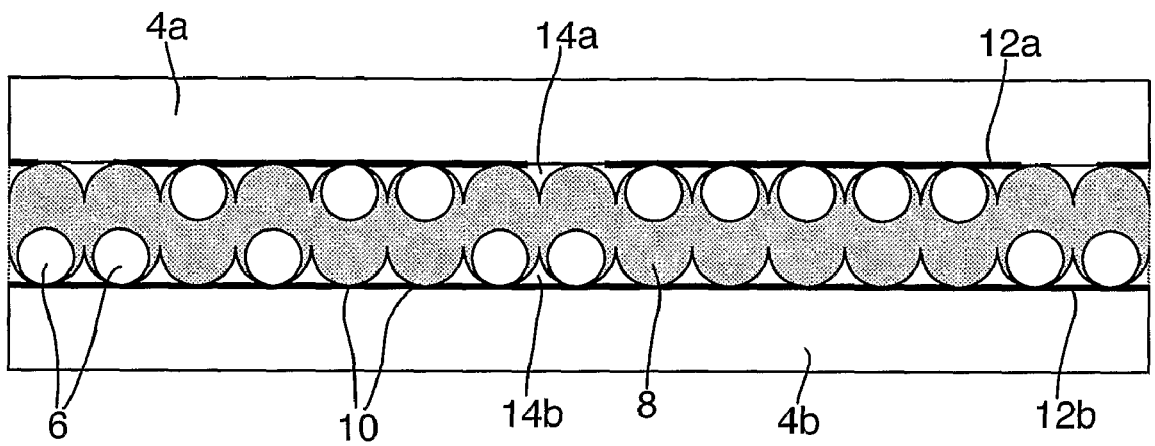
FIG. 1 shows a schematic cross sectional representation of an electrophoretic display comprising an electrophoretic cell having particles of an electrophoretic material suspended within a liquid crystal suspension medium. The electrophoretic cell incorporates relief structures arranged at the surfaces of the display to promote defects within the liquid crystal material.

Referring to FIG. 1, an electrophoretic display 2 comprises an electrophoretic cell in which particles of an electrophoretic material 6 are suspended in a suspension medium 8 comprising a liquid crystal material. The particles of electrophoretic material have an electrical charge associated therewith when suspended in this manner. Application of an electric field to the cell causes the charged particles to move therein under the influence of the applied electric field. The geometry of the system is arranged to promote defects 10 within the liquid crystal material.

The above mentioned electrophoretic cell and electrophoretic display are described in further detail in patent application PCT/GB03/003512.

The operation of the electrophoretic display is described briefly hereunder by way of background to the present invention.

In the above configuration, the presence of the particles of electrophoretic material 6 distorts the alignment of the liquid crystal material in the vicinity of the particles 6 and hence the particles 6 act as mobile defects 10, or collections of defects, within the system. When the particles of electrophoretic material are in the bulk of the suspension medium 8 they are relatively free to move under the influence of an applied electric potential. However, when a particle is within the region of influence associated with a defect 10 in the liquid crystal material, an interaction occurs between the defects 10, thereby reducing the total liquid crystal defect energy within the system. The total liquid crystal defect energy within the system is reduced when the particle 6 and the defect 10 are as close as possible and in some cases superposed, in which case the defects. 10 or disclinations effectively annihilate. When the defects 10 interact or annihilate, the particle 6 will tend to adhere to the point in the display where the defect 10 originally occurs or occurred (hereinafter referred to as the defect core).

In the absence of an applied electric potential, the particle of electrophoretic material 6 will tend to remain at a preferred position associated with the defect core. This is because the energy of the material is lower in this configuration (with the particle 6 close to or on top of the defect core) than when the particle 6 is in the bulk liquid crystal material. This provides the advantage that the long term permanence of the image displayed by the device is improved over a conventional electrophoretic display where the electrophoretic material merely adheres to the surfaces of the display due to Van der Waals attraction and electrostatic forces.

In order to remove the particle of electrophoretic material 6 from the region of influence associated with the defect core, an electric potential must be applied to the display which is sufficient to overcome the potential energy barrier associated with the defects 10.

As discussed above, defects interact with each other in order to reduce the elastic energy of the liquid crystal. Accordingly the defects associated with a particle 6 are influenced by the defects associated with the preferred positions in the liquid crystal cell. Typically, in any particular region of the liquid crystal cell, the region of influence associated with one particular defect will dominate. In this way the elastic energy of the system is reduced by moving the particle 6 towards a defect with opposite strength to the defect(s) associated with the particle 6. Conversely work must be done by an applied electric potential to move the particle 6 from a defect to which it is attracted. With sufficient work done by the applied electric potential then the particle 6 may be moved form the region of influence associated with a particular defect. If insufficient field is applied then the particle will relax back to its initial position. This threshold behaviour imparts a non-linear electro-optic behaviour to the display and is what makes passive matrix addressing of the device possible.

FIG. 1 shows a multi-stable electrophoretic display created by arranging defects 10 in the liquid crystal material 8 on opposing surfaces 4a, 4b within the electrophoretic display 2. For example, a first set of defects 10 is arranged on the first (front) surface 4a of the display whilst a second set of defects 10 is arranged on the second (rear) surface 4b of the display. The particles of electrophoretic material 6 may be encouraged to migrate from the first surface 4a to the second surface 4b of the display (and vice versa) by the application of an electric potential to electrodes 12a, 12b which exceeds the threshold level for a sufficient time period.

As mentioned above, work must be done by the applied electric potential to separate the particle 6 from a defect to which it is attracted. With sufficient work done by the applied electric potential then the particle 6 may be moved to a region of the liquid crystal cell where the region of influence of another defect is dominant. The particle 6 will then relax to a new position in the cell being the preferred position associated with this new defect. Once the region of greatest influence of this second defect is reached it is no longer required that an electric potential is applied to the cell. In this way a threshold in the applied electric potential is required to move the particle 6 far enough away from its initial position so that it relaxes to the a new position in the cell. As discussed above, if the magnitude of the applied is small and/or the time period for which the field is applied is short then the particle 6 will relax back to its initial preferred position.

The multi-stable display provides the advantage that the particles of electrophoretic material 6 remain bound at the defect cores when no potential is applied the device. Moreover, the particles of electrophoretic material 6 remain substantially bound to the defect cores even in the presence of low level electric potentials (below the threshold level of the device) and where the applied field comprises pulses having a short duration. This is advantageous since such electric potentials are inherent in multiplexed addressing schemes. Image quality and therefore large area addressing capability is therefore ensured by reducing unwanted migration of particles of electrophoretic material 6 within the device.

The defects 10 or disclinations in the liquid crystal material 8 are introduced by a three-dimensional relief structure 14a, 14b which, in this case, comprises a two-dimensional array of concave indentations, each indentation having a depth d, arranged at a pitch p, within the array. FIG. 1 illustrates a specific example where the indentations are approximately hemispherical. However, the shape of the indentations is not limited to a hemispherical form, and in practice the indentations may take the form of any of a wide range of shapes (for example, semi-ellipsoids, semi-spheroids, semi-spheres, rectilinear shapes etc.).

The relief structure surface is adapted to provide a preferred orientation of the liquid crystal material within the display. The preferred alignment of the liquid crystal on the relief structure surface is one which generates +½ defects at the base of the hemispherical indentations. Typically, the preferred alignment of the liquid crystal material comprises an essentially non-homeotropic alignment of the liquid crystal director at the relief structure surface, i.e. a tangential component of the liquid crystal director is encouraged giving a tilted or planar alignment at the surface of the relief structure 14a, 14b. In this configuration, the liquid crystal director may adopt a number of possible configurations each with a different elastic energy and typically depending on the history of the sample. The preferred alignment is that where the bulk of the liquid crystal is in a homeotropic configuration.

Problems may be encountered in configurations where the preferred alignment of the liquid crystal material gives rise to strong localised distortions of the liquid crystal director. The distortions within the liquid crystal director create a high degree of elastic or defect energy within the material which can lead to instability of the preferred liquid crystal alignment.

Figure 2:
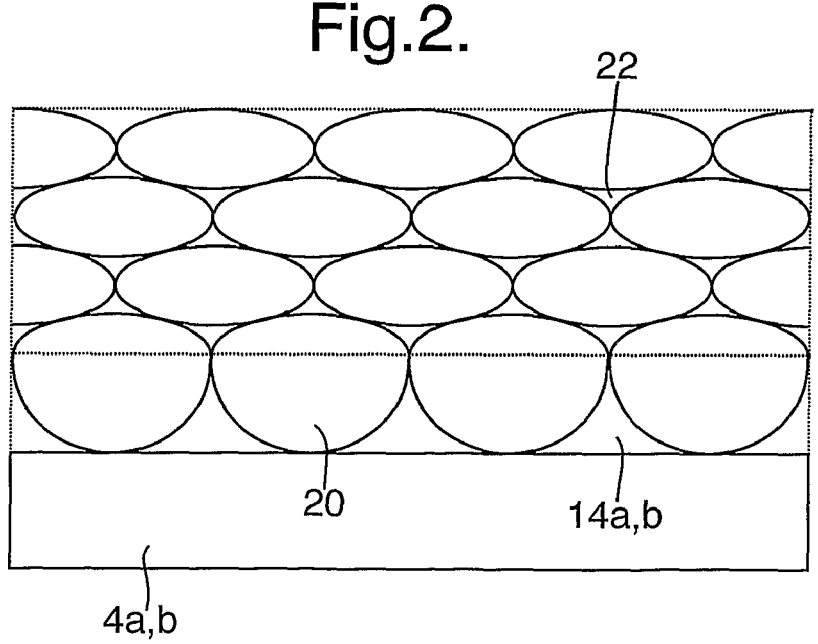
FIG. 2 shows a schematic representation of the internal profile of a typical relief structure used in the electrophoretic display of FIG. 1. The figure illustrates the two-dimensional array of indentations which comprise the internal relief structure surface and shows the flat regions of the relief structure which typically occur between the indentations.
Figure 3:
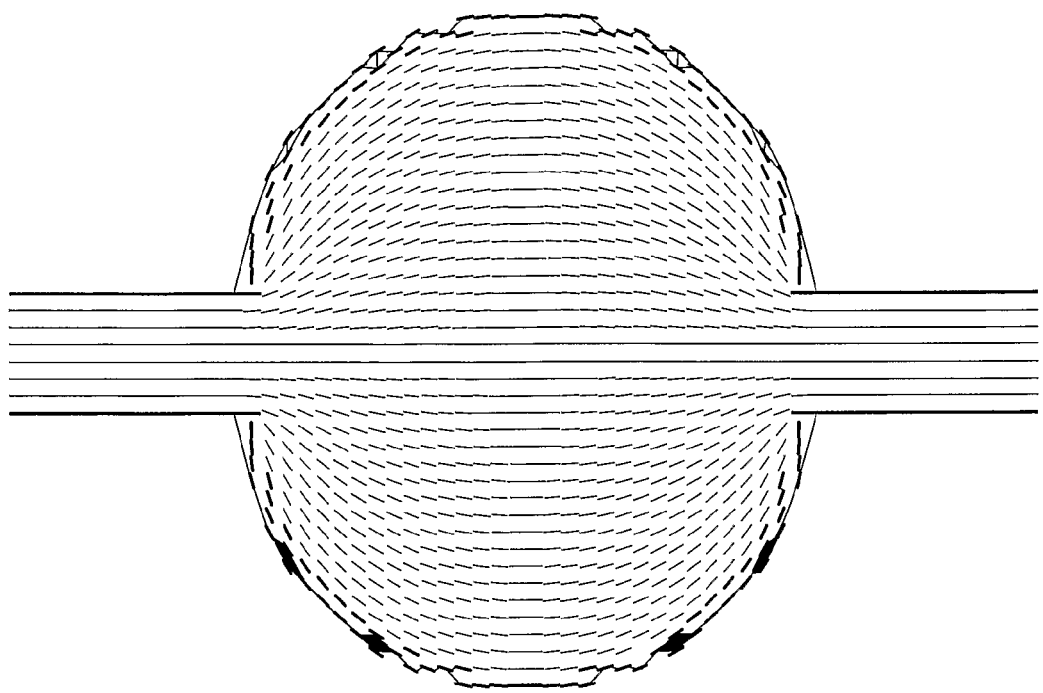
FIG. 3 illustrates the configuration of the liquid crystal director within the electrophoretic cell according to a three-dimensional model of the cell. The figure shows a cross-sectional representation of the modelled cell. In this particular arrangement of the cell the director is aligned predominantly in the plane of the modelled device and perpendicular to the cross-section. This is the 'bulk planar' configuration.
Figure 4:
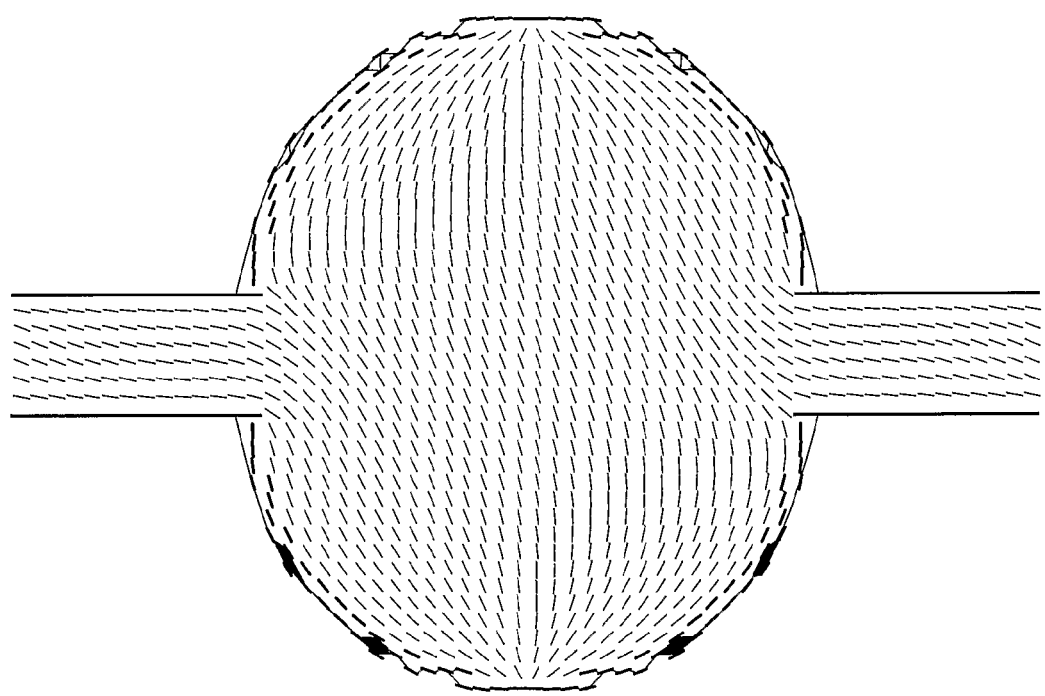
FIG. 4 illustrates an alternative configuration of the liquid crystal director within the electrophoretic cell according to a three-dimensional model of the cell. The figure shows a cross-sectional representation of the modelled cell. In this particular arrangement of the cell the director is aligned predominantly perpendicular to the plane of the modelled device and parallel to the cross-section. This is the 'bulk homeotropic' configuration.

A particular configuration which can give rise to strong localised distortions of the liquid crystal director is discussed hereunder with reference to FIG. 2. Note, the electrophoretic particles 6 are not shown in the figure for clarity.

Referring to FIG. 2, where the concave indentations 20 are semi-ellipsoidal, semi-spheriodal, or semi-spherical, the cross section of each indentation at the surface of the relief structure 14a, 14b, will typically be substantially elliptical or substantially circular and hence the indentations cannot cover the whole relief structure surface without intersecting. If the indentations 20 do not intersect then there are regions 22 on top of the relief structure 14a, 14b which are substantially flat.

In the electrophoretic cell 2 the flat tops 22 have the same planar alignment as the rest of the relief structure. As in the foregoing, for the +½ defects 10 to exist at the bottom of the indentations 20 then the liquid crystal alignment in the middle of the cell must be homeotropic. However, corner effects occur where the edges of the indentations intersect with the relief structure surface, due to the fact that the angle subtended at the intersection is approximately 90 degrees (see FIG. 2). Accordingly, the liquid crystal experiences a sharp change in the direction of the director alignment at these intersections. Hence, above the flat top regions 22 the liquid crystal director is highly distorted.

The localised distortions in the liquid crystal director have an important effect on the overall amount of elastic energy associated with this configuration. Accordingly, the configuration described above exhibits a large amount of residual elastic energy within the liquid crystal material due to the cumulative effect of the localised distortions in the liquid crystal director.

A certain degree of residual elastic energy is tolerable within the electrophoretic cell.

However, in practice the liquid crystal material will always try to adopt a configuration within the electrophoretic cell which minimises the residual elastic energy. The configuration in which the residual elastic energy is minimised may not always coincide with the preferred configuration of the liquid crystal material within the cell (i.e. that which gives rise to +½ defects 10 at the bottom of the depressions 20, and a substantially homeotropic alignment of the liquid crystal in the middle of the cell). For example, the configuration in which the residual elastic energy is minimised may be that in which there are no defects 10 in the liquid crystal.

Even if the preferred configuration of the liquid crystal material can be achieved at the outset, said configuration may not necessarily be stable if an alternative configuration would provide a lower residual elastic energy.

The surface relief of the-phoretic cell has a similar structure to that shown in FIG. 2. However, the alignment of the liquid crystal material in the vicinity of the flat tops 22, interposed between the indentations 20, is planar. The alignment of the liquid crystal material within the indentations 20 is planar, in common with the cells described above.

The preferred alignment of the liquid crystal material within the indentations 20 gives rise to the required +½ defects 10 at the bottom of the indentations 20 and a substantially homeotropic alignment of the liquid crystal in the bulk of the cell.

Rather than apply liquid crystal alignment treatments directly to the indentations 20 and flat tops 22 there-between, the method of the present invention exploits a surface memory effect in order to provide the preferred configuration of the liquid crystal material within the present phoretic cell.

Surface memory behaviour arises when a liquid crystal material is in contact with a solid surface and wherein the alignment of the liquid crystal in contact with the surface is reinforced by the continual diffusion of molecules in and out of the solid surface. Typically, polymers provide a surface which facilitates diffusion of molecules. This is unlike conventional commercial liquid crystal devices, where the liquid crystal alignment is previously determined by rubbing the polymer.

The relief structure in a phoretic cell according to the present invention comprises an isotropic polymer that doesn't predetermine the liquid crystal alignment. For example, an amorphous or cast polymer may be used. By way of further example, the isotropic polymer may be fabricated from an elastomer, a monomer, a pre-polymer or oligomer. This means that, by careful cell construction, the surface memory can be used to achieve the best alignment of the liquid crystal director within the phoretic cell.

In practice, the depressions may be generally semi-ellipsoidal, semi-spheroidal, semi-spherical, or hemispherical. Where the indentations exhibit a substantially elliptical cross section at the relief structure surface, the radius shall be taken to be the length of the major semi-axis of the ellipse at the relief structure surface (the semi-axis representing half the length of the axis).

As before, where the indentations exhibit a substantially elliptical cross section at the relief structure surface, the radius shall be taken to be the length of the major semi-axis of the ellipse at the relief structure surface (the semi-axis representing half the length of the axis).

A method according the present invention for fabricating an electrophoretic cell comprises the following steps:

A substrate having an electrode pattern thereon is prepared. An isotropic polymer having a surface energy high enough to impose planar liquid crystal alignment (typically >30 erg/cm$^2$) is applied to the prepared substrate. A relief structure profile, typically comprising an array of hemispherical indentations, is formed in the isotropic polymer. Suitable isotropic polymers include thermoplastics, photo-polymers and cross-linked monomers/polymer. Specific examples of suitable polymers are styrene and acrylate.

In the case of a photo-polymer, the relief structure is fabricated using conventional photolithograhic techniques. Typically, a mask and UV light source are used to pattern the polymer; for example a High Energy Beam Sensitive (HEBS) grey scale photomask (Canyon Materials Inc.) may be used to preferentially expose portions of the polymer. The polymer is subsequently developed and the unwanted portions of resist removed, for example by washing the processed substrate. This then gives the surface relief shape shown in FIGS. 1 and 2.

Finally the substrate is processed to cross link the polymer, thereby improving its resistance to solvents.

Alternatively, the relief structure is formed in the isotropic polymer by embossing. The embossing process is carried out by using a photoresist shape to form a mould and then using this mould to emboss the isotropic polymer.

At this stage of the process, a planar alignment exists on the internal surface of the indentations 20 and on the flat tops 22 interposed between the substantially hemispherical indentations 20. The next step in the process is to impart the preferred alignment to the relief structure.

At least one substrate having a relief structure applied thereto, is incorporated into a electrophoretic cell using conventional fabrication techniques. The surface of the electrophoretic cell opposing the at least one substrate preferably has a homeotropic liquid crystal alignment treatment applied thereto to facilitate the alignment step. This configuration also enables the alignment of the liquid crystal material at the relief structure to be assessed by the observation of 'noyaux points'. Alternatively, the opposing surface may comprise a second substrate having a relief structure applied thereto.

A suitable electrophoretic liquid is selected which displays a nematic liquid crystal phase at temperatures below $T_c$, (the clearing point of the nematic mixture) and when in the nematic phase shows a positive anisotropy of dielectric permittivity or magnetic permeability. The electrophoretic liquid is selected such that the value of $T_c$ is above the working temperature of the phoretic cell.

Alternative to a nematic liquid crystal phase, an electrophoretic material having any of the following phases may be used: Smectic A, Smectic C, Hexatic smectic B, Smectic F, Smectic I and their chiral analogues including Ferroelectric, Ferrielectric and Antiferroelectric analogues; Blue Phase 1, Blue Phase 2, Twist Grain Boundary (TGB) phases (come in a variety of forms analogous to the smectic phases listed above); Crystal Smectic phases including Crystalline Smectic B, Crystalline Smectic E, Crystalline Smectic G, Crystalline Smectic H, Crystalline Smectic J, Crystalline Smectic K; Columnar phases occurring with discotic molecules including $D_h$, $D_{rd}$, and $D_{ob,d}$.

The electrophoretic liquid is heated to a temperature above $T_c$. In practice the electrophoretic cell may be heated prior to the addition of the electrophoretic liquid. Electrophoretic liquid is filled into cell using conventional techniques such as capillary filling or vacuum filling. The electrophoretic liquid is in the isotropic phase throughout this procedure.

A magnetic or electric field is applied to the cell of sufficient strength to cause alignment of the director predominantly along the field lines when the nematic phase forms. The field direction may be stable (e.g. a D.C. electric field), or preferably alternating (e.g. an A.C. electric field).

The cell is cooled below $T_c$ with the field applied. This encourages the nematic to align with the bulk director orientation homeotropic to the flat tops 22 and the required defects to form at the bottom of the gratings. Typically, the cooling rate is in the range 1-5 ° C. per minute.

Once cooled into the nematic phase, the field is turned off. There is ideally a waiting time between the formation of the nematic phase and the time when the field is turned off. Typically, the waiting time may lie in the range 10-60 minutes.

This process ensures the required alignment is achieved. After this time the alignment is self-reinforcing. The memorised alignment can only be removed by heating the system above $T_c$, for an extended period of time.

In the interests of clarity, the electrophoretic liquid used in the electrophoretic cell during the alignment process may comprise the liquid crystal suspension medium for the completed device, in which case the material is retained in the cell after the alignment process has been completed. Alternatively, the liquid crystal suspension medium may be substituted for the electrophoretic liquid after the alignment process has been completed. A suitable liquid crystal suspension medium comprises MLC 6876-100.

Electrophoretic particles may be added to the electrophoretic cell in the foregoing method at the time of incorporating the electrophoretic liquid. Alternatively, the cell is made without particles, then slit open, and the electrophoretic liquid removed. The particles are then added and the cell refilled with liquid crystal electrophoretic liquid. This latter approach is particularly applicable if the particles are metallic or are electrically conductive.

Sample devices have been fabricated using the above methods in order to verify the technique.

Specifically, a surface relief was made according to the process outlined in the method described above. This was assembled into a test device with another surface relief opposite and filled with a suitable nematic liquid crystal mixture. After removing the applied field, the alignment of the nematic mixture in the cell was observed to be in the required alignment state by the observation of 'noyaux points' (ref. DeGennes & Prost, 1993, Page 163) within the overwhelming majority of depressions. The regions surrounding these noyaux appear as crosses when observed between crossed polarisers, with the arms of the crosses aligned with the polarisers regardless of the orientation of the test cell. This verifies that these crosses are due to a defect at the centre of the cross.

The embodiments of the present invention comprising electrophoretic displays have been described and illustrated herein as having simple row and column electrodes. However, this is not a limitation and in practice alternative addressing means may be used with the present electrophoretic displays, for example Thin Film Transistor (TFT) matrices.

Notwithstanding the inclusion of electrodes in the electrophoretic display devices described herein, the electrophoretic display may be operated using an electric potential applied to the display via electrodes external to the device. Further, the electric potential may comprise an electrostatic field applied externally to the device via removable electrodes.

The foregoing embodiments of the phoretic display device according to the present invention have been described predominantly in terms of electrophoretic behaviour. However, as highlighted earlier, magnetophoretic behaviour is equally applicable to the embodiments described herein. Indeed magnetophoretic operation may be employed as a substitute for electrophoretic operation in the previous embodiments. Alternatively, magnetophoretic operation and electrophoretic operation may be used in combination to alter the display state of the devices described herein.

In order to incorporate magnetophoretic behaviour into any of the aforementioned embodiments merely requires use of a phoretic particle having magnetic or ferromagnetic properties. The phoretic particle would then respond to an applied magnetic field in a manner analogous to that described previously for an electric field. For example, in a magnetophoretic display according to the present invention, the display state is switchable by applying a magnetic field of a given field strength to the display. The magnetic field may be provided by a permanent magnet (e.g. in the form of a pen or stylus tipped with a magnet) or could be generated electromagnetically. As before, the phoretic particle would migrate within the device under the influence of the applied field (albeit a magnetic field rather than an electric or electrostatic field as before).

A hybrid display device exhibiting both electrophoretic and magnetophoretic behaviour offers further switching combinations. For example, such a hybrid display could be switched spatially using a localised magnetic field from a pen or stylus tipped with a magnet. However, the display could then be erased by application of an electric potential to the entire display, which would switch the phoretic particles to one state as in a purely electrophoretic display. Moreover, information written on such a display may be recorded by detecting the small current pulse induced by the device switching between display states. This detection may be implemented by incorporating patterned electrodes in the display and erasing the image one line at a time.

The invention claimed is:

1. A relief structure alignment layer comprising a relief structure surface incorporating at least one indentation, the at least one indentation having an internal surface extending from the relief structure surface, wherein the relief structure alignment layer has a surface memory alignment layer arranged to impart a preferred liquid crystal director alignment to a liquid crystal material in contact therewith.

2. A relief structure alignment layer according to claim 1 wherein the preferred alignment of the liquid crystal director comprises a substantially planar alignment at the internal surface of the at least one indentation, a substantially homeotropic alignment in the bulk of the liquid crystal material and a defect in the liquid crystal alignment associated with each indentation in the absence of a phoretic particle there from.

3. A relief structure alignment layer according to claim 1 comprising a relief structure surface incorporating a plurality of indentations, each indentation having an internal surface extending from the relief structure surface.

4. A relief structure alignment layer according to claim 1 wherein the surface memory alignment layer imposes a substantially planar liquid crystal director alignment at the relief structure alignment layer in the presence of a randomly oriented liquid crystal material.

5. A relief structure alignment layer according to claim 1 wherein the surface memory alignment layer comprises an isotropic material.

6. A relief structure alignment layer according to claim 5 wherein the isotropic material has a surface energy greater than 30 erg/cm$^2$.

7. A phoretic display comprising a first display surface, a liquid crystal suspension medium, at least one phoretic particle suspended within the suspension medium, and at least one relief structure alignment layer according to claim 1.

8. A phoretic display according to claim 7 wherein the at least one relief structure alignment layer is arranged at the first display surface.

9. A phoretic display according to claim 8 comprising a second display surface disposed remotely to the first display surface, and a second relief structure alignment layer disposed at the second display surface.

10. A phoretic display according to claim 7 wherein each indentation is dimensioned so as to at least partly receive a phoretic particle.

11. A phoretic display according to claim 9, wherein each indentation in the relief structure surface of the first relief structure alignment layer is arranged substantially opposite a corresponding indentation in the relief structure surface of the second relief structure alignment layer, said indentations forming an opposing pair of indentations.

12. A phoretic display according to claim 11 wherein each opposing pair of indentations encompasses a phoretic particle.

13. A phoretic display according to claim 7 wherein the liquid crystal suspension medium is capable of adopting a nematic liquid crystal phase.

14. A phoretic display according to claim 13 wherein the liquid crystal suspension medium exhibits a positive anisotropy of dielectric permittivity when in the nematic liquid crystal phase.

15. A phoretic display according to claim 13 wherein the liquid crystal suspension medium exhibits a positive anisotropy of magnetic permeability when in the nematic liquid crystal phase.

16. A method for configuring a liquid crystal material within a cell having a relief structure alignment layer; the relief structure alignment layer comprising a relief structure surface incorporating at least one indentation, the at least one indentation having an internal surface extending from the relief structure surface, the relief structure alignment layer having a surface memory alignment layer arranged to interact with an oriented liquid crystal material in contact therewith exhibiting a preferred liquid crystal director alignment and adapted to reproduce said preferred liquid crystal director alignment; the method comprising the steps of
    (i) introducing into the cell a liquid crystal material having an isotropic phase,
    (ii) applying a field to the display comprising at least one of an electric field and a magnetic field,
    (iii) converting the liquid crystal material from the isotropic phase to an oriented liquid crystal phase in the presence of said applied field thereby imparting the preferred alignment of the liquid crystal director within the cell, and
    (iv) removing the applied field.

17. A method according to claim 16 wherein the oriented liquid crystal phase comprises a nematic liquid crystal phase.

18. A method according to claim 16 wherein the preferred alignment of the liquid crystal director comprises a substantially planar alignment at the internal surface of the at least one indentation, a substantially homeotropic alignment in the bulk of the liquid crystal material and a defect in the liquid crystal alignment associated with each indentation in the absence of a phoretic particle therefrom.

19. A method according to claim 16 wherein the field is applied in a direction substantially normal to the relief structure alignment layer.

20. A method according to claim 16 wherein the applied field comprises an electric field and the liquid crystal material exhibits a positive anisotropy of dielectric permittivity.

21. A method according to claim 16 wherein the applied field comprises a magnetic field and the liquid crystal material exhibits a positive anisotropy of magnetic permeability.

22. A method according to claim 16 wherein the step of converting the liquid crystal material from the isotropic phase to the oriented liquid crystal phase comprises cooling the liquid crystal material from a temperature above the clearing point $T_c$ of the liquid crystal material.

23. A method according to claim 16 comprising an additional step of introducing a temporal delay between the step of converting the liquid crystal material from the isotropic phase to the oriented liquid crystal phase and the step of removing the applied field.

* * * * *